(12) United States Patent
Yuzefovich

(10) Patent No.: US 9,049,311 B2
(45) Date of Patent: Jun. 2, 2015

(54) AUTOMATED VOICE CALL TRANSCRIPTION AND DATA RECORD INTEGRATION

(71) Applicant: Michael Yuzefovich, Falls Church, VA (US)

(72) Inventor: Michael Yuzefovich, Falls Church, VA (US)

(*) Notice: Subject to any disclaimer, the term of this patent is extended or adjusted under 35 U.S.C. 154(b) by 0 days.

(21) Appl. No.: 13/969,000

(22) Filed: Aug. 16, 2013

(65) Prior Publication Data

US 2014/0050307 A1 Feb. 20, 2014

Related U.S. Application Data

(60) Provisional application No. 61/684,291, filed on Aug. 17, 2012.

(51) Int. Cl.
H04M 1/64 (2006.01)
H04M 15/00 (2006.01)

(52) U.S. Cl.
CPC .............. *H04M 15/41* (2013.01); *H04M 15/68* (2013.01)

(58) Field of Classification Search
CPC ........ H04M 1/663; H04M 1/578; H04M 1/57
USPC ................................ 379/68, 88.21; 705/26.64
See application file for complete search history.

(56) References Cited

U.S. PATENT DOCUMENTS

| | | | | |
|---|---|---|---|---|
| 6,310,944 B1* | 10/2001 | Brisebois et al. | ........ | 379/142.01 |
| 6,977,993 B2* | 12/2005 | Starbuck et al. | ........... | 379/88.21 |
| 7,463,724 B2* | 12/2008 | Ruckart | .................... | 379/88.21 |
| 8,504,439 B1* | 8/2013 | Ezzo | ......................... | 705/26.64 |

* cited by examiner

*Primary Examiner* — Fan Tsang
*Assistant Examiner* — Van D Huynh
(74) *Attorney, Agent, or Firm* — Emdadi Patent Law; Kamran Emdadi

(57) ABSTRACT

An application may provide a communication session platform for a first participant to communicate to a second recipient in a service provider capacity. For instance a doctor, lawyer or other service provider may initiate a call application on a their user device and the device may transmit a communication session request to another user device of a patient or client, via the call application. The application may also provide transmitting a consent request to the client user device requesting consent to a term described by a pre-recorded content segment and receiving a confirmation message from the client user device agreeing to the consent request, and bridging the communication session between the client user device and the service provide user device.

18 Claims, 10 Drawing Sheets

AUTOMATED VOICE CALL TRANSCRIPTION AND DATA RECORD INTEGRATION

CROSS-REFERENCE TO RELATED APPLICATION

This application claims priority to earlier filed provisional application No. 61/684,291 filed Aug. 17, 2012 and entitled "AUTOMATED VOICE CALL TRANSCRIPTION AND DATA RECORD INTEGRATION", the entire contents of which are hereby incorporated by reference.

TECHNICAL FIELD OF THE INVENTION

This application relates to an automated voice call or telephone call integration application for a mobile device. More particularly, a two-way phone call may be seamlessly recorded, transcribed and integrated with one or more data applications to document the call occurrence and trigger a patient updating and/or billing operation.

BACKGROUND OF THE APPLICATION

Conventionally, business interactions for doctors and lawyers and other appointment based services tend to be in-person, such as in the doctor's office or at a particular venue. However, due to the increase in cell phone usage there is also, in turn, an increase in the amount of phone calls that service-based professionals endure due to their patients' or clients' needs. In reality, the professional service providers are spending large amounts of time on the phone without any way to bill for the phone calls especially for those that involve services to their clients'.

Phone calls may be generated via a landline telephone or via a mobile station or cell phone. Calls may be received and transmitted during non-working hours and in places away from the desk and/or computer of the professional service provider persons. As a result, The consultations, advice or other services shared between the service providing professional and their clients' may go unnoted, undocumented and/or unbilled for services rendered.

SUMMARY OF THE APPLICATION

One example method of operation may include initiating a call application on a first user device, transmitting a communication session request to a second user device via the call application, transmitting a consent request to the second user device requesting a user to consent to at least one term described by a pre-recorded content segment, receiving a confirmation message from the second user device agreeing to the consent request, and bridging the communication session between the first user device and the second user device.

An example embodiment may provide an apparatus that includes a processor configured to initiate a call application on a first user device, a transmitter configured to transmit a communication session request to a second user device via the call application, and a consent request to the second user device requesting a user to consent to at least one term described by a pre-recorded content segment, a receiver configured to receive a confirmation message from the second user device agreeing to the consent request, and wherein the processor is further configured to bridge the communication session between the first user device and the second user device.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Figure 1:
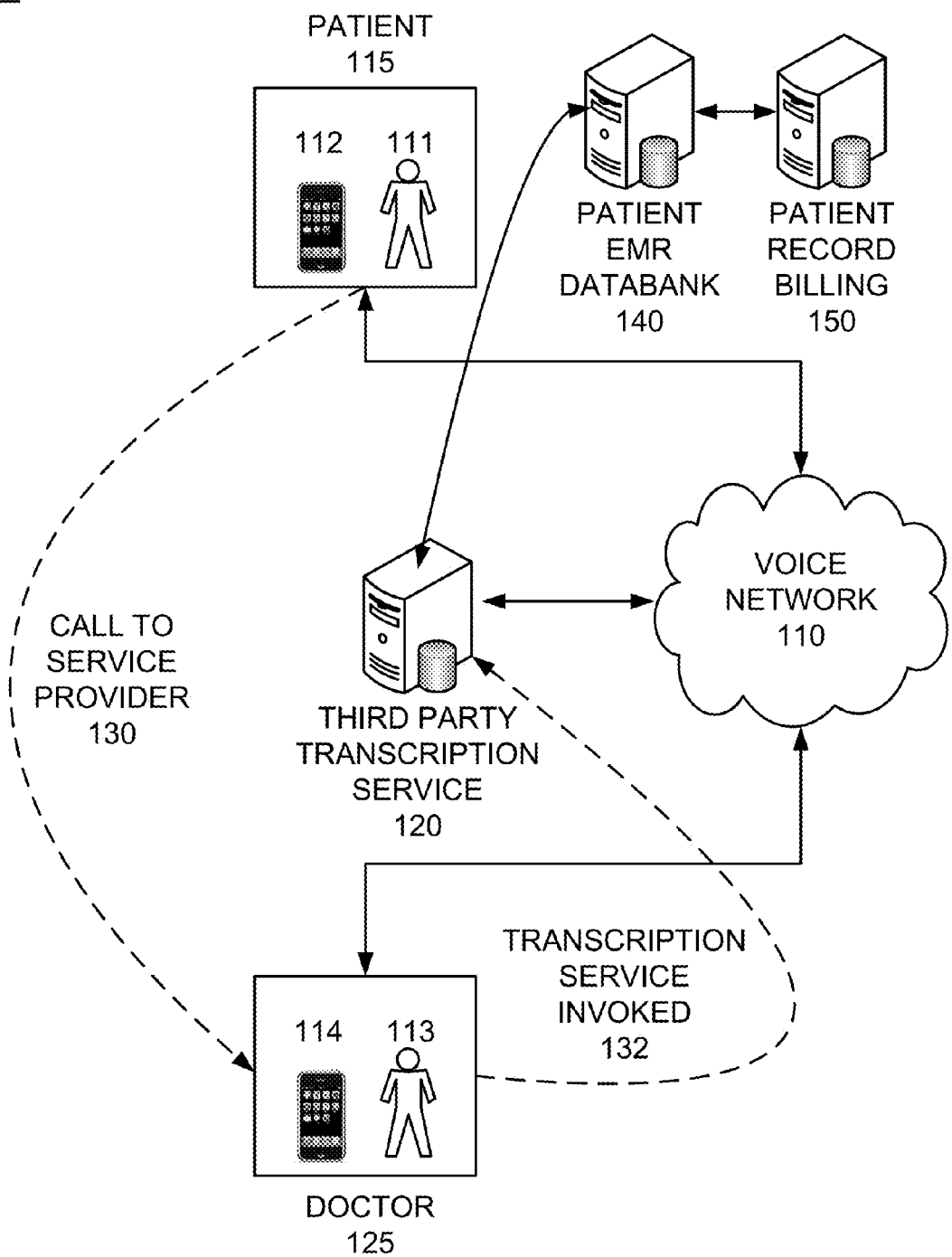
FIG. 1 illustrates an example communication network illustrating of a call transcription, patient record and billing record integrated system.

FIG. 1 illustrates an example communication network 100 including a calling party 111, a called party 125, a voice network 110, a third party transcription service 120, a patient electronic medical record (EMR) databank 140, and a patient record billing server 150. For example purposes, the network configuration 100 may be used by a doctor, lawyer or any service provider who conducts client and/or patient conversations over the phone. For the example illustrated in FIG. 1, a doctor's service-based practice will be used to illustrate the functionality of the mobile station application used by the doctor 125, the third party transcription service 120 and other data record services, such as the patient EMR server 140 and patient billing 150.

In operation, a patient 115 may be a person 111 who operates his or her phone or smartphone device 112 to call the doctor 125 who is also represented as a person 113 operating his or her phone or smartphone device 114. The patient may call the doctor 'on-call' in response to a follow-up to a recent office visit at operation 130. The call may be routed via a base station/mobile switching station (not shown) to a voice network 110, which forwards the call to the doctor on-call 125. The call may cause the doctor's phone to ring and the doctor may answer the call by clicking "answer" or any other phone button or user interface option.

According to one example embodiment, the patient's telephone number may be cross-referenced with a patient database, such as the patient EMR databank 140, which automatically invokes a graphical user interface to appear to the doctor 125 offering options, such as "record call", "transcribe call", "add call to patient's EMR", "bill for call", etc. Alternatively, the call may be answered without any presumption regarding whether the caller was a patient or someone else. In this case, if the caller is unknown, the doctor 125 may still answer the call and invoke the application on his or her smartphone to offer additional options regarding how to process the call.

According to one example, the doctor 125 may initiate a record call function 132 and/or transcription service to begin so that the voice data from the call is recorded and processed by a third party transcription service operating on a third party server 120. The voice from the call may be recorded digitally and transferred as data messages which are transcribed and/or stored in the third party transcription service server 120. The patient's EMR information may be stored in a remote databank 140 and may be linked to the transcribed call so that the textual output of the call is automatically placed in the patient's EMR records and stored for later retrieval via a patient EMR database record retrieval. The linking may be accomplished by identifying the caller by a patient identifier, such as a spoken name "patient Michael Smith" that is identified from the voice information or by referencing the patient by a spoken identification number, a phone number, etc.

The patient identifier may be parsed during the transcription process or by a function performed by the EMR patient databank 140 once the transcription has been processed. The patient identifier may then be identified from the parsing operation and used to locate the patient EMR so an association function can be performed to add the content of the call to the patient's EMR based on the identified patient identifier. The patient identifier (e.g., name, phone number, identification number, etc.) may then be used to trigger a search function that locates the record in the databank 140 based on the patient identifier. Once the record is located, the transcription data may be inserted into the patient's EMR and stored as an updated EMR record.

The transcription data may have certain metadata available, such as call purpose, call date, call length, etc., so the proper bill may be generated and delivered to a patient EMR record for billing purposes. The accounting application used to generate the patient bill 150 may include a patient record and corresponding bill production function that identifies the patient's latest service as a call, which may have an assigned billing code or a standard fee associated with the call. The call may be added to an existing bill or a new bill depending on the patient's recent status in the patient record billing server 150.

Figure 2A:
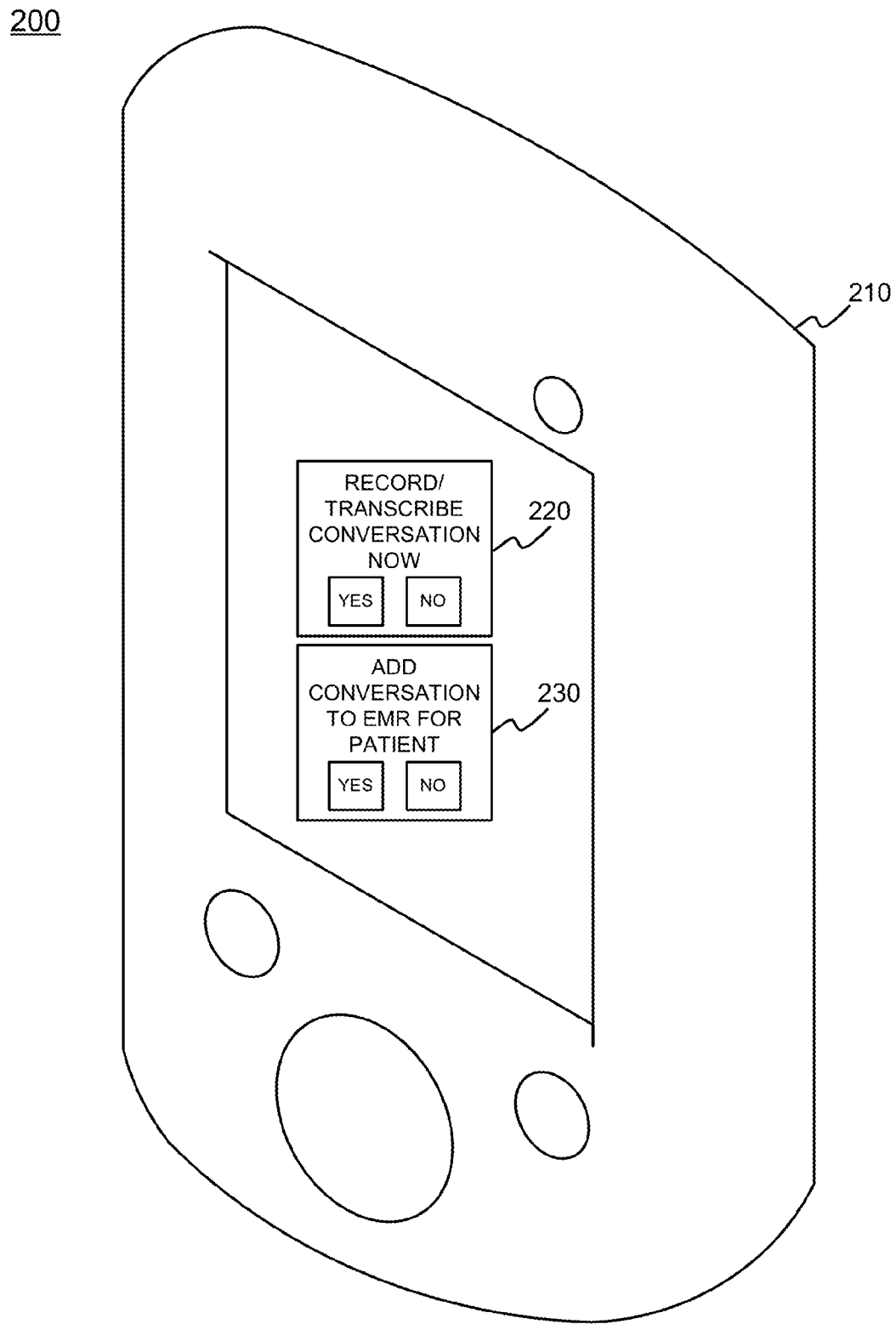
FIG. 2A illustrates an example graphical user interface according to an example application operated on the service provider's mobile station.

FIG. 2A illustrates an example of the smartphone application used by the doctor to record, transcribe, and link the present call to the patient's EMR records and/or to the billing records. According to FIG. 2A, the call application and corresponding mobile device 200 may include a smartphone device 210 that operates a patient conversation processing application with various menu options. For example, once the call is received, the operator may invoke the patient processing application installed on the smartphone 210. The menu options may include to begin recording the call 220 and/or to add the conversation to the EMR for that patient 230. By selecting one or more of these application menu options, the doctor may initiate the call voice to be recorded and processed accordingly. The application may create and insert links to the transcription server 120, the patient EMR databank/server 140 and/or the patient record billing server 150 so the call is properly associated with proper database records.

Figure 2B:
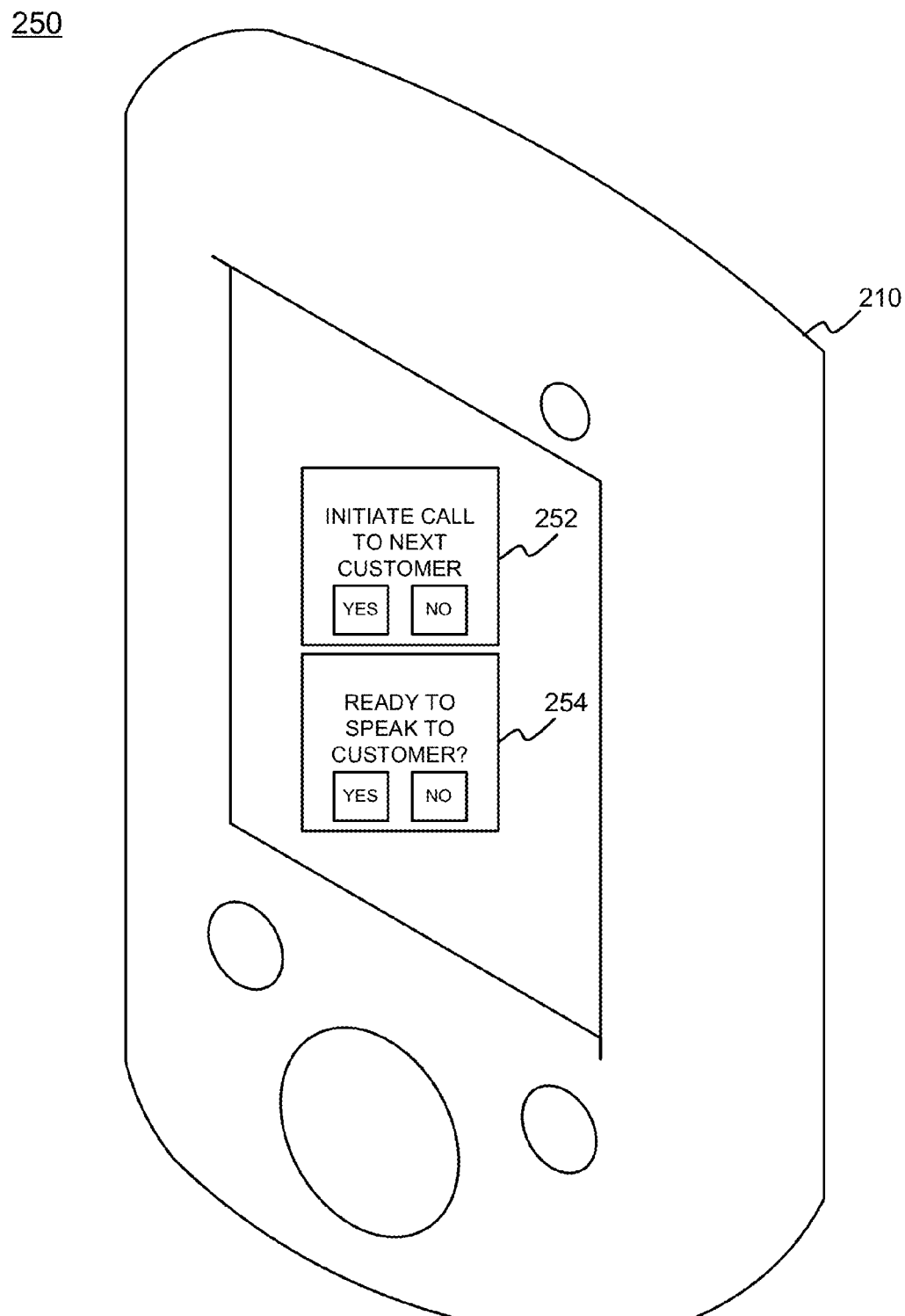
FIG. 2B illustrates an example graphical user interface according to an example application operated on the service provider's mobile station.

FIG. 2B illustrates another graphical user interface according to another example embodiment. Referring to FIG. 2B, the smartphone application 250 may now provide an option to setup a call with a particular patient, client and/or customer via menu option 252. The client may be part of a list of clients to be called via the automated application per the user's request. For example, the doctor may have multiple patients to call-back to confirm pain, medication results, post-surgery recovery, etc. The patient's may be part of a list of patients accessible as a record stored in a remote database to the phone application.

Figure 5:
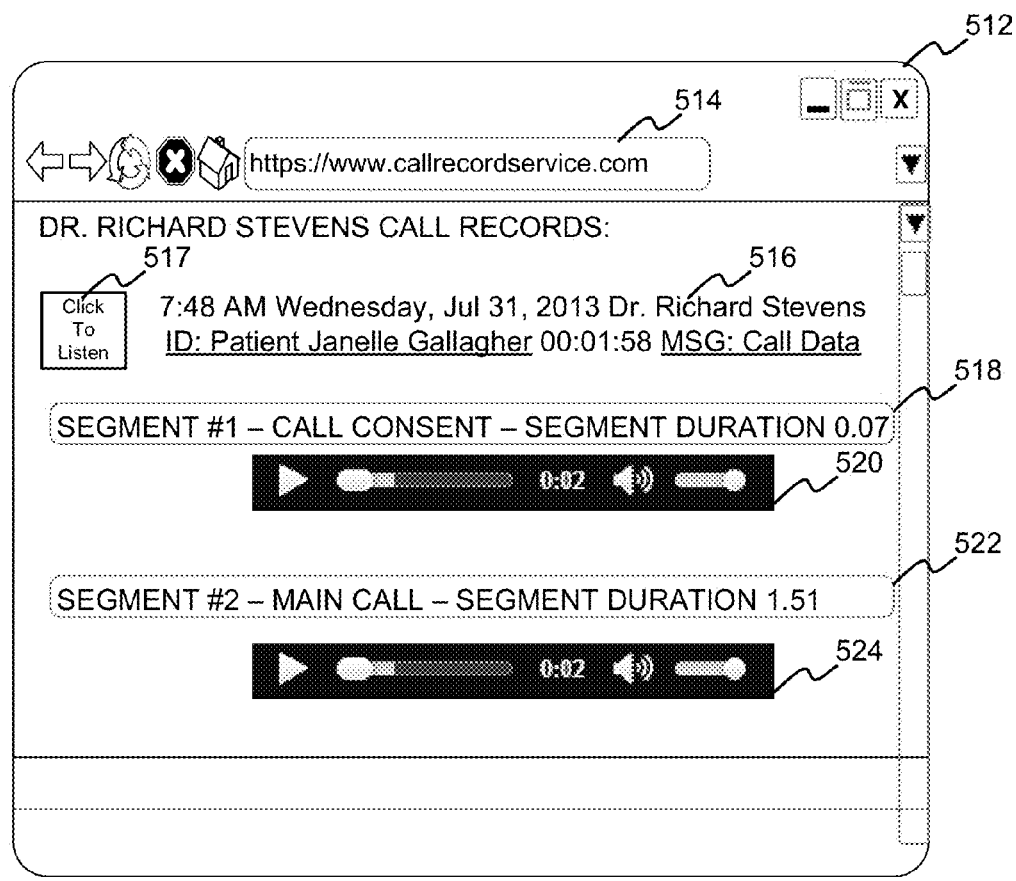
FIG. 5 illustrates an example graphical user interface (GUI) display of the application providing access to a specific recorded customer call according to example embodiments.

In operation, the doctor may permit the application to initiate and select a first patient to call in the list of patients who are part of a task list to call-back and talk about their current condition. The application may then commence by referencing the patient's telephone number and dialing the number. Once the patient answers his or her phone, the application may then initiate an automated response menu or interactive voice response function that asks the patient a question(s) and awaits a response prior to asking more questions or confirming the patient has consented to the rules of the call. For example, a disclaimer may be read to the patient via the automated menu and a response "Yes" or "No" may be spoken and recorded. The patient may be required to identify him or herself prior to being in contact with the doctor. The IVR menu may say: "At the tone, please state your name, date of birth, and whether you consent to have the call recorded and used for billing purposes to your account". Following the menu prompt, the patient may state his or her name, date of birth and answer "yes" I consent. The first portion of the call may be recorded and stored as a consent portion as illustrated in FIG. 5 (discussed in detail below). At this point, the call may be initiated to the doctor's phone and the doctor may receive a menu option to answer the call 254. If the doctor accepts the call may be bridged between the doctor and the patient.

Figure 3:
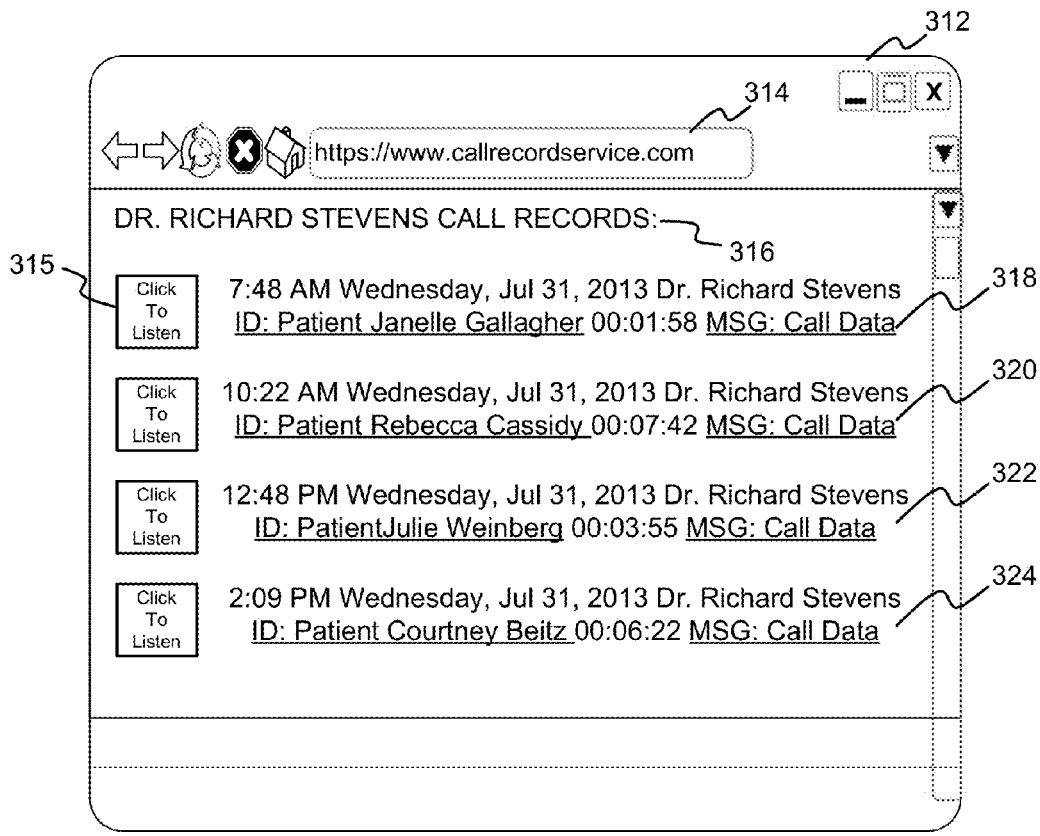
FIG. 3 illustrates an example graphical user interface (GUI) display of the application providing access to recorded customer calls according to example embodiments.

FIG. 3 illustrates an example graphical user interface (GUI) display of the application providing access to recorded customer calls according to example embodiments. Referring to FIG. 3, the user interface 300 may be a web-based application interface 302 that provides access to previously recorded voice calls and/or video calls for a particular user profile 316. The website 314 may be a third party application site that can be accessed from anywhere so a user can setup an account and have their voice calls and/or video calls recorded and stored as a record for each call that was conducted. For example, the four calls 318-324 for Dr. Richard Stevens 316 may be accessible as listed in order by date and time. Each call corresponds to a different patient and has a corresponding time of recording and call duration associated with each call. The listen tabs 315 are on the left and provide the user with an option to access and listen to the call at any time.

The application may also be configured to create a web link to any of those entries in FIG. 3 and e-mail, fax, electronic fax, create a database entry, text message, etc., the link along with other metadata to a billing accountant so the record of the call can be identified by whoever processes the bills and keeps records of the calls. The accountant can see the link, listen to the audio view any video, see the doctor's note which may have been made before the call ended and the application is shut down. For instance, after the call recording has ended the application may ask the doctor, "would you like to make a note? Please type your comments here". Thereafter that additional data may be sent along with the audio/video link and the billing representative can then draw a conclusion faster to finalize the bill and select the proper billing code depending on the time of the call, the doctor's comments regarding the call purpose, etc.

Figure 4:
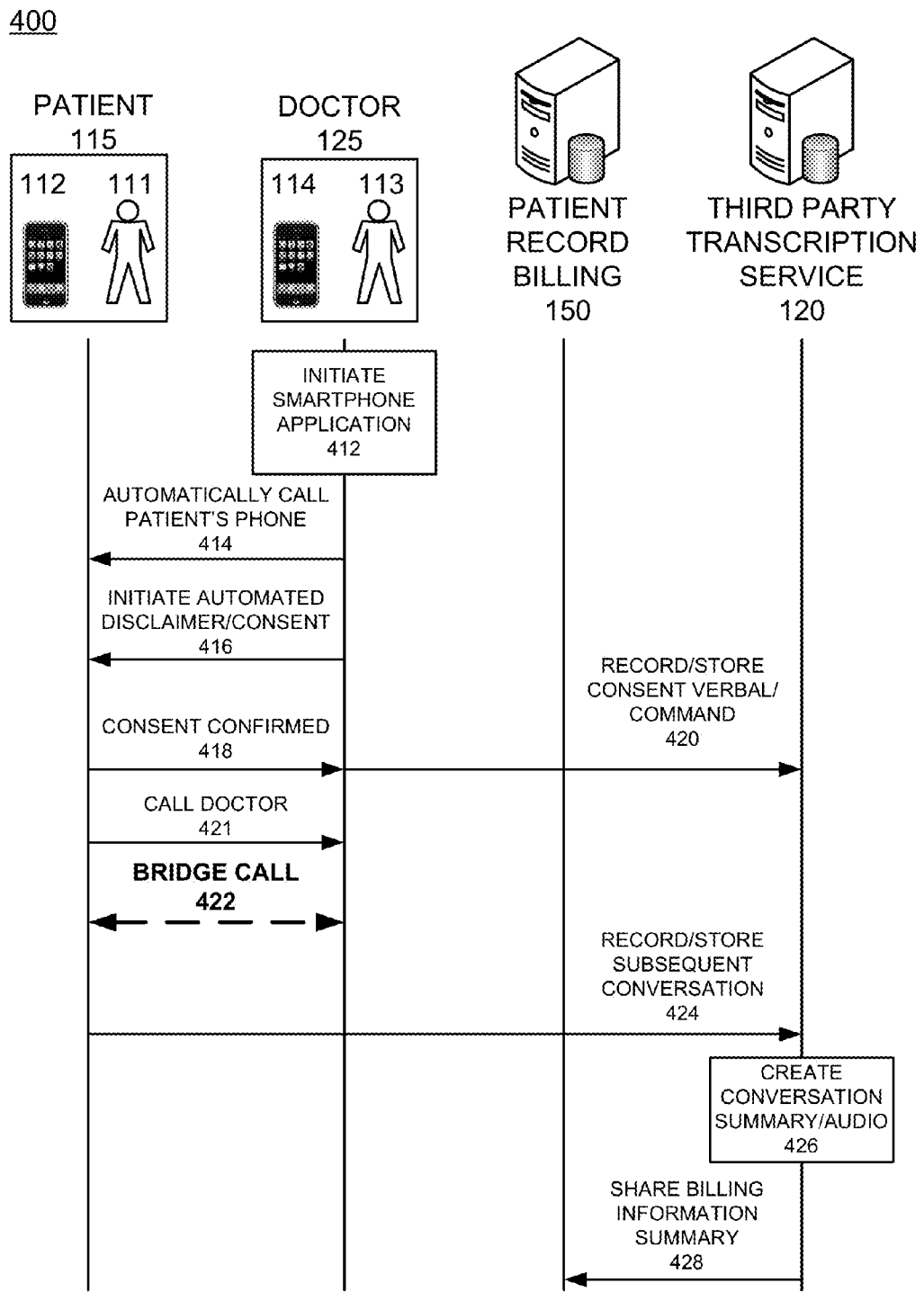
FIG. 4 illustrates a system signaling diagram of the communications shared among the different system devices during application implementation according to example embodiments.

FIG. 4 illustrates a system signaling diagram of the communications shared among the different system devices during application implementation according to example embodiments. Referring to FIG. 4, The diagram 400 includes a doctor 125 as a person 113 operating a smartphone 114 with this client management application installed. The patient 115 may be a person 111 with a cell phone or smartphone 112 capable of being called by the doctor's phone 114. The doctor 125 may initiate the application 412 which begins by retrieving a patient telephone number from memory. The number may be part of a list of patients that need to be called extracted from a task application. The number may also be entered manually by the doctor or may be based on a previously missed call or a request from the tasking application to call the patient 115.

Once the application has been initiated, the application may identify a telephone number and dial the number 414. The application may also prepare an automated response menu that begins when the patient 115 answers the call. During this time, the doctor may put the smartphone down and walk away as the call will be bridged after the patient has agreed to the terms and conditions and has provided authentication information. The application may then provide the patient with an automated instruction to begin speaking at the tone 416. The instructions may request, name, date of birth, password, account number, social security number, age, etc. Once the menu prompts the user, the user must type in the correct answers using the keypad or may speak the correct answers as a short audio segment. The audio may be converted to digital words which are then cross-referenced with the correct answers in the patient's profile. For example, the words used to say the social security number may be converted to a digital number that is then matched to the user's account prior to connecting the doctor. Also, the recorded authorization segment may instead be played for the doctor who may then approve the authorization by pressing "1" or saying "yes". Also, a video frame or frames of the user may be presented to the doctor for authorization purposes or used as the basis for a digital authentication procedure based on previous frames of the user's face. The automated menu may also require the user to consent to the call being recorded and used as the basis for billing purposes (i.e., consent/disclaimer 416). All this information may be stored and referenced later from memory if necessary.

Next, the patient 115 may confirm and consent 418 to the rules and procedures of the call and the spoken words, video and/or user selections may be stored 420 in a database of a third party transcription server 120. After the authorization and consent have been confirmed, the patient 115 may be waiting to speak with the doctor on the phone. The application may then hold the patient's call while dialing the doctor's phone 421. During this time, the application may provide instructions to the patient regarding good patient/doctor phone etiquette so the call is conducted properly when the doctor answers. The patient call may then be bridged with the doctor's phone 422 once the doctor answers the call. The content of the call may then be immediately recorded 424 and transferred to the third party transcription service where the audio, video, etc., is received, recorded, stored in memory and which may be transcribed for other purposes.

After the call is finished. The patient and the doctor may hang up and the application may still be active on the doctor's phone. The application may then offer the doctor an opportunity to create additional notes whether spoken or written which may be included with the case file what was just created to record the call. The conversation summary, audio, video, etc. may be stored in memory 426. Also, if the patient was showing the doctor any video pertaining to the patient's condition or if an image was taken and sent to the doctor during or contemporaneous with the call then that data may also be identified and stored as part of the call record. In summary, the call record may include two audio segments, one short segment for authorization and consent, another segment for the duration of the call itself. The call may also include video from a video phone application, images taken and shared during the call, text messages (SMS messages) shared during or contemporaneous with the call and/or written comments in a comment box offered by the application during or after the call has finished. All this information may be stored as a patient record which is shared with all intended recipients by default or specified by the application (i.e., the doctor may type in the billing manager's email at the end of the call). The information may be sent as an e-mail 428 to a patient billing or record keeping application to be integrated automatically into the patient's EMR file or to a billing expert's inbox for bill finalizing procedures.

According to other examples, the doctor may initiate the application and select whether to perform a phone consultation or a video consultation. The application may then dial the interactive voice response (IVR) platform at a remote server, which then dials the patient or the client and requests consent and identification information. That information may be stored and verified prior to any call leg being established with the doctor or other party. The consent portion may be recorded and verified prior to any subsequent call legs being established by checking a database of patient records to verify the patient identity and/or by confirming the user has said the word "yes", "consent" or other words or phrases indicating agreement with the conditions. The recorded segment may also be played to the doctor prior to establishing the call leg so the doctor may confirm the patient name and the consent prior to answering the phone.

In another example, the patient may initiate the same application and call the doctor. If the doctor does not answer an e-mail or other message may be generated that the patient called and the doctor needs to call the patient back. If the doctor does not answer the phone, the IVR application may generate a voice message that includes the client identifier for future reference. Also, if the patient prematurely disconnects or does not answer then the IVR application may inform the provider and send a summary that the patient did not respond. Once the two call legs are established and the communication session has been connected, the application may generate an email with a link to the patient identifier and/or consent and may include other data (i.e., metadata), such as call length, date, provider name, etc. A separate link may be established to provide the call consultation information. The information may be stored in a third party cloud-based application server, a patient electronic medical record and/or a transcription company. The information may be paired with a billing application that selects a billing code or current procedural terminology (CPT) code depending on the number of minutes, such as, for example, 99499 for consults 1-4 minutes, 99441 for consults 5-10 minutes, 99442 for consults 11-20 minutes, and 99443 for consults 21-30 minutes.

FIG. 5 illustrates an example graphical user interface (GUI) display of the application providing access to a specific recorded customer call according to example embodiments. Referring to FIG. 5, the user interface 500 provides a detailed snapshot of a web-based portal or application interface 512 that is accessible via a web address 514 and login procedure. The doctor may have an account that is accessed online and a particular patient's audio may be identified by name, date, Dr. name, patient information, call time and date 516. The audio may be heard by selecting the listen tab 517. The call is generally broken down into two separate segments 518 and 522. The first segment includes audio for the consent portion 520, which may be anywhere between a few seconds and 30 seconds in duration. The second segment 522 may include audio 524 for the call itself which may be approximately 1-15 minutes in duration. If the call duration is long enough, it may trigger an automatic billing procedure assuming there is some threshold time minimum for a call to be billable or not (e.g., 1, 2, 3, 4, 5 minutes, etc.).

Figure 6:
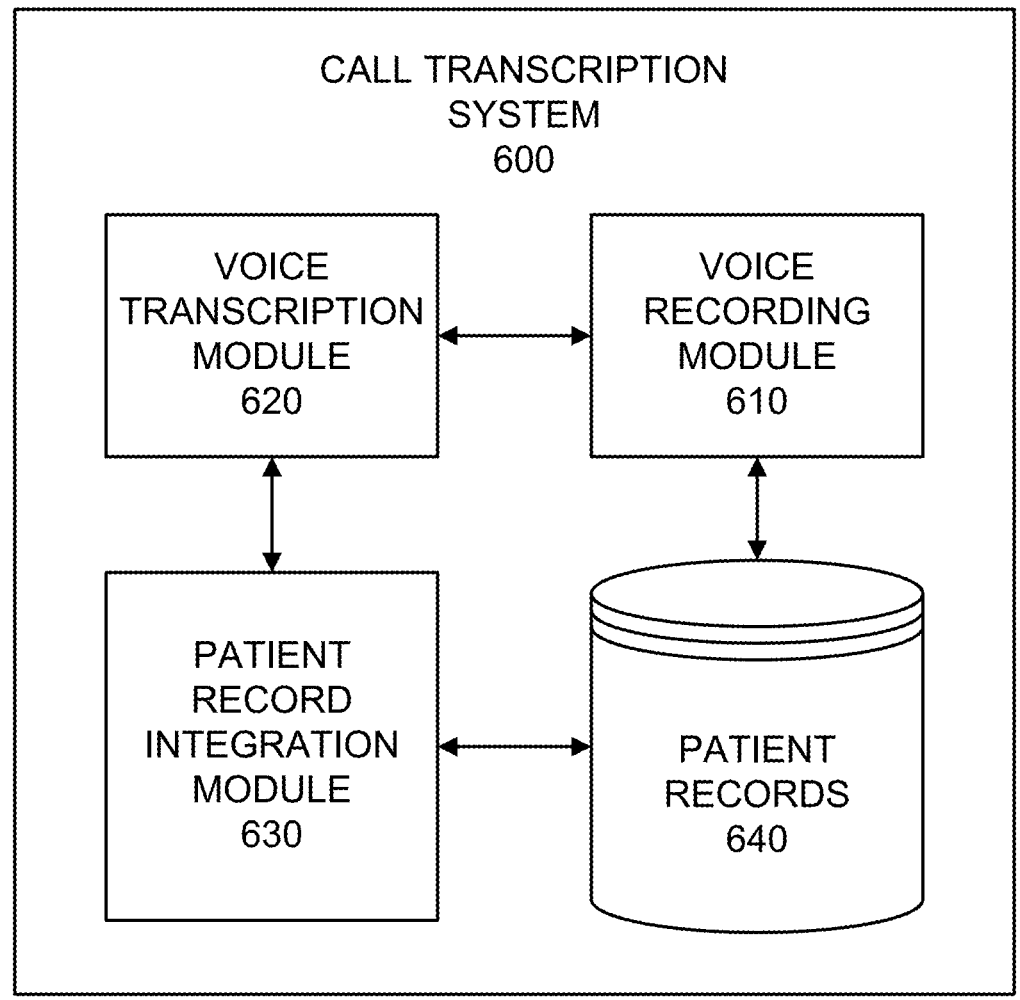
FIG. 6 illustrates an example call transcription system according to example embodiments.

FIG. 6 illustrates a call transcription and processing system 600. Referring to FIG. 6, a voice recording module 610 may record the patient's voice and the doctor's voice conducted over the course of the call. The voice transcription module 620 may transcribe the recorded voice into text and the patient record integration module 630 may insert pointers or links into the text transcription data so the data may be integrated into an existing patient's records stored in the databank 340. Alternatively, a new patient EMR record may be created to include the transcribed conversation. Metadata or parsed data may be used to populate headers or identifiers associated with the patient record. For example, spoken words may be identified as triggers to initiate a new record, populate a patient name field, initiate a billing action including a billing code, etc. There may be list of predefined words included on a list or lists that when spoken, transcribed and parsed may initiate various actions in the patient's EMR.

The doctor may ask the patient at the onset of the call whether they agree to have the call recorded prior to engaging in any voice recording function. Such a question may satisfy the requirements of any federally or locally administered laws regarding privacy or agreement. The application may remind the doctor by speaking to the doctor and/or the patient as a reminder so the patient may accept/decline to have the call recorded.

In the event that the doctor's practice does not have an EMR record keeping system, the transcription can be processed and transmitted to an email address, a fax machine, a database record keeping system, etc. The transcription of the call may be the doctor's recipient device of choice, for example, the designated manager of the medical practice, at which time this designated person can store the transcription in the client's chart and choose a billing system to bill the client for services rendered.

According to another example embodiment, the application and corresponding communication device may receive and direct the audio data to a secure and HIPPA compliant record keeping system that can transcribe the recording. Once transcribed, this transcription may be forwarded, by a predetermined setting according to the respective physicians/controlling entities choice, so the transcription is directly sent to the electronic health record, e-fax, email, facsimile, etc. The physician/controlling entity, may then decide whether to keep this recording as a health record and/or submit this recording to the patient or any $3^{rd}$ party insurance company, as a verification of a physician/patient consultation and bill for such services rendered.

The physician/controlling entity may be able to activate this application when desired, prior to calling the patient. When the patient is called, a recording may be initiated stating that a designated health professional is on the phone, and this conversation will be recorded, as you have requested a consultation with your health care provider. Once the patient acknowledges this disclaimer by pressing "1" on their phone or saying "Yes" the consultation will begin and the doctor will be connected over the phone with the patient. The physician/controlling entity, may pay the service provider a rate for using this service.

According to another example embodiment, the system 600 may be configured to initiate a call application on a first user device, such as a smartphone operated by a doctor, a lawyer or any service provider professional. The system 600 may initiate by transmitting a communication session request to a second user device via the call application, such as a patient home phone, cell phone, smartphone, digital voice application, video conference application, etc. The application may also create and transmit a consent request to the second user device requesting a user to consent to at least one term described by a pre-recorded content segment (i.e., "do you consent to have this session recorded and used for billing purposes, if so, state your name, date of birth and yes or no when prompted"). As a result, the application may receive a confirmation message from the second user device agreeing to the consent request, such as an indicator that the user said 'yes' or an audio segment recorded to reflect the user's confirmation. The patient's call may be setup as a call leg between the user device and the application. The application may also dial the first device and wait until the user accepts the call before bridging the communication session between the first user device and the second user device.

The communication request may be a request for a phone call session or a video conference session. The first user device may be a smartphone or a computer and the second user device may be a smartphone, a mobile phone, a landline telephone and a computer. Also, a communication session request is transmitted by dialing a telephone number or transmitting a video conference request to an email account. The pre-recorded content segment may be a pre-recorded audio segment and/or a pre-recorded video segment. In another example, a first call leg between the second user device and the call application may be setup first, then the first user device may be called by the application to establish a second call leg responsive to receiving the confirmation message that the second user device has agreed to the terms and conditions. Then, the communication session between the first user device and the second user device may be bridged once the second call leg to the first user device is accepted. Additionally, a spoken message created in response to the consent request may be recorded and stored as a first segment or first content segment in a user profile record. The call may then be conducted and a new recording or second recording may then begin to record, and either audio and/or video content generated during the communication session may be generated and recorded as a second segment. The audio and/or video content may then be stored as a second content segment. Thereafter, the first content segment and the second content segment may be paired together in the user profile record as a common call or common session used and referenced as a single database record of the communication session. In one example, a link may be created with access to both the first content segment and the second content segment and the link may be transmitted to a predetermined recipient address (e.g., email address of the billing agent or personnel). For example, the predetermined recipient address may be at least one of a fax machine, a digital fax account, an email address, and an electronic database record.

Figure 7A:
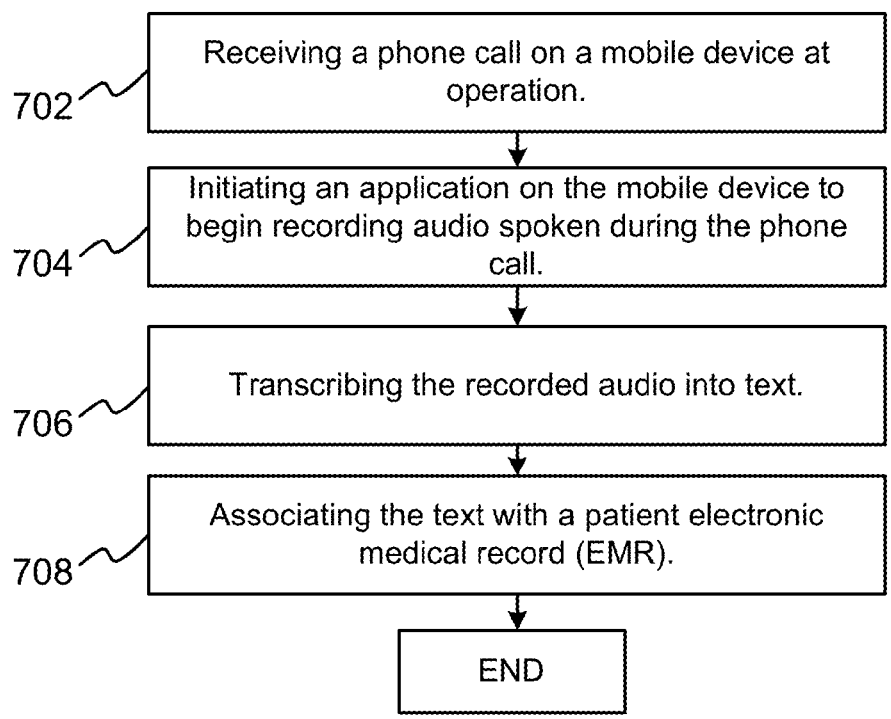
FIG. 7A illustrates a flow diagram of an example method of operation.

FIG. 7A illustrates an example flow diagram 700 of the operations included in an example method of operation. According to one example method of operation, the method may provide receiving a phone call on a mobile device at operation 702. The method may also include initiating an application on the mobile device to begin recording audio spoken during the phone call at operation 704, transcribing the recorded audio into text at operation 706 and associating the text with a patient electronic medical record (EMR) at operation 708.

Figure 7B:
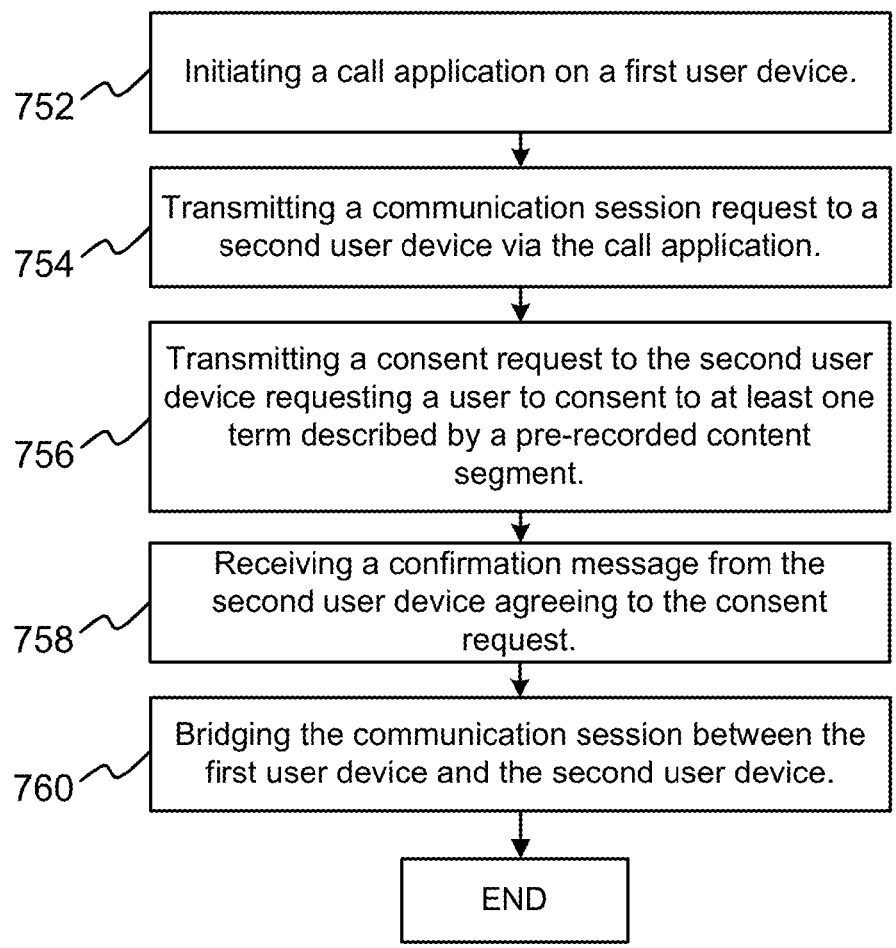
FIG. 7B illustrates a flow diagram of an example method of operation.

FIG. 7B illustrates another example flow diagram 750 according to operations included in another example method of operation. Referring to FIG. 7B, The method may include initiating a call application on a first user device at operation 752 and transmitting a communication session request to a second user device via the call application at operation 754. The method may also include transmitting a consent request to the second user device requesting a user to consent to at least one term described by a pre-recorded content segment at operation 756, receiving a confirmation message from the second user device agreeing to the consent request at operation 758 and bridging the communication session between the first user device and the second user device at operation 760.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 8 illustrates an example network element 800, which may represent any of the above-described network components of the other figures.

Figure 8:
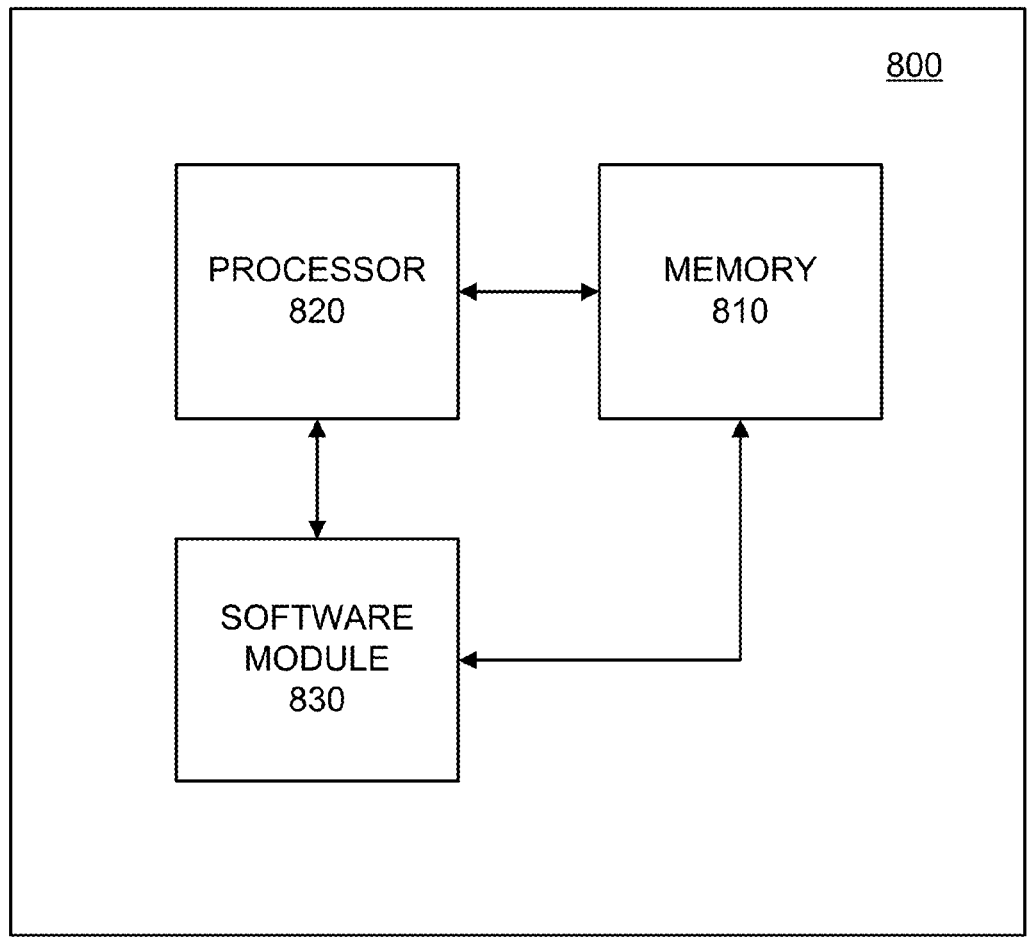
FIG. 8 illustrates a network entity that may include memory, software code and other computer processing hardware used to perform various operations according to example embodiments.

As illustrated in FIG. 8, a memory 810 and a processor 820 may be discrete components of the network entity 800 that are used to execute an application or set of operations. The application may be coded in software in a computer language understood by the processor 820, and stored in a computer readable medium, such as, the memory 810. Furthermore, a software module 830 may be another discrete entity that is part of the network entity 800, and which contains software instructions that may be executed by the processor 820. In addition to the above noted components of the network entity 800, the network entity 800 may also have a transmitter and receiver pair configured to receive and transmit communication signals (not shown).

Although an exemplary embodiment of the system, method, and non-transitory computer readable medium of the present application has been illustrated in the accompanied drawings and described in the foregoing detailed description, it will be understood that the present invention is not limited to the embodiments disclosed, but is capable of numerous rearrangements, modifications, and substitutions without departing from the spirit or scope of the invention as set forth and defined by the following claims. For example, the capabilities of the system illustrated in FIG. 6 may be performed by one or more of the modules or components described herein or in a distributed architecture. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method comprising:
    initiating a call application on a first user device;
    transmitting a communication session request to a second user device via the call application;
    transmitting a consent request to the second user device requesting a user to consent to at least one term described by a pre-recorded content segment;
    receiving a confirmation message from the second user device agreeing to the consent request;
    bridging the communication session between the first user device and the second user device;
    creating a first call leg between the second user device and the call application;
    dialing the first user device via the call application to establish a second call leg responsive to receiving the confirmation message; and
    bridging the communication session between the first user device and the second user device once the second call leg to the first user device is accepted.

2. The method of claim 1, wherein the communication request is at least one of a request for a phone call session and a video conference session.

3. The method of claim 1, wherein the first user device is at least one of a smartphone and a computer and the second user device is at least one of a smartphone, a mobile phone, a landline telephone and a computer.

4. The method of claim 1, wherein transmitting a communication session request comprises at least one of dialing a telephone number and transmitting a video conference request to an email account.

5. The method of claim 1, wherein the pre-recorded content segment is at least one of a pre-recorded audio segment and a pre-recorded video segment.

6. The method of claim 1, further comprising:
recording a spoken message created in response to the consent request;
storing the spoken message as a first content segment in a user profile record;
recording at least one of audio and video content generated during the communication session;
storing the at least one audio and video content as a second content segment;
pairing the first content segment and the second content segment together in the user profile record;
creating a link with access to both the first content segment and the second content segment; and
transmitting the link to a predetermined recipient address.

7. The method of claim 6, wherein the predetermined recipient address is at least one of a fax machine, a digital fax account, an email address, and an electronic database record.

8. An apparatus comprising:
a processor configured to initiate a call application on a first user device;
a transmitter configured to transmit a communication session request to a second user device via the call application, and a consent request to the second user device requesting a user to consent to at least one term described by a pre-recorded content segment;
a receiver configured to receive a confirmation message from the second user device agreeing to the consent request, and
wherein the processor is further configured to bridge the communication session between the first user device and the second user device, create a first call leg between the second user device and the call application, dial the first user device via the call application to establish a second call leg responsive to receiving the confirmation message, and bridge the communication session between the first user device and the second user device once the second call leg to the first user device is accepted.

9. The apparatus of claim 8, wherein the communication request is at least one of a request for a phone call session and a video conference session.

10. The apparatus of claim 8, wherein the first user device is at least one of a smartphone and a computer and the second user device is at least one of a smartphone, a mobile phone, a landline telephone and a computer.

11. The apparatus of claim 8, wherein the transmitter transmits a communication session request that comprises at least one of dialed telephone number and a video conference request to an email account.

12. The apparatus of claim 8, wherein the pre-recorded content segment is at least one of a pre-recorded audio segment and a pre-recorded video segment.

13. The apparatus of claim 8, wherein the processor is further configured to:
record a spoken message created in response to the consent request,
store the spoken message as a first content segment in a user profile record,
record at least one of audio and video content generated during the communication session,
store the at least one audio and video content as a second content segment,
pair the first content segment and the second content segment together in the user profile record;
create a link with access to both the first content segment and the second content segment, and
transmit the link to a predetermined recipient address.

14. The apparatus of claim 13, wherein the predetermined recipient address is at least one of a fax machine, a digital fax account, an email address, and an electronic database record.

15. A non-transitory computer readable storage medium configured to store instructions that when executed cause a processor to perform:
initiating a call application on a first user device;
transmitting a communication session request to a second user device via the call application;
transmitting a consent request to the second user device requesting a user to consent to at least one term described by a pre-recorded content segment;
receiving a confirmation message from the second user device agreeing to the consent request;
bridging the communication session between the first user device and the second user device;
creating a first call leg between the second user device and the call application;
dialing the first user device via the call application to establish a second call leg responsive to receiving the confirmation message; and
bridging the communication session between the first user device the second user device once the second call leg to the first user device is accepted.

16. The non-transitory computer readable storage medium of claim 15, wherein transmitting a communication session request comprises at least one of dialing a telephone number and transmitting a video conference request to an email account.

17. The non-transitory computer readable storage medium of claim 15, wherein the pre-recorded content segment is at least one of a pre-recorded audio segment and a pre-recorded video segment.

18. The non-transitory computer readable storage medium of claim 15, wherein the processor is further configured to perform:
recording a spoken message created in response to the consent request;
storing the spoken message as a first content segment in a user profile record;
recording at least one of audio and video content generated during the communication session;
storing the at least one audio and video content as a second content segment;
pairing the first content segment and the second content segment together in the user profile record;
creating a link with access to both the first content segment and the second content segment; and
transmitting the link to a predetermined recipient address, wherein the predetermined recipient address is at least one of a fax machine, a digital fax account, an email address, and an electronic database record.

* * * * *